United States Patent
Shimada et al.

[11] Patent Number: 6,012,635
[45] Date of Patent: *Jan. 11, 2000

[54] APPARATUS FOR SETTLING TRANSACTIONS WITH CARD

[75] Inventors: Katsumi Shimada, Kawasaki; Rieko Asai, Machida; Chizuo Suzuki, Kawasaki; Seiji Mori, Kawasaki; Kyouko Terada, Kawasaki; Asako Haseba, Kawasaki, all of Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/618,731

[22] Filed: Mar. 20, 1996

Related U.S. Application Data

[63] Continuation of application No. 08/247,756, May 23, 1994, abandoned.

[30] Foreign Application Priority Data

May 28, 1993 [JP] Japan .................................. 5-126440

[51] Int. Cl.⁷ ..................................................... G06K 5/00
[52] U.S. Cl. .......................... 235/380; 235/379; 235/375; 235/492; 235/493
[58] Field of Search ..................................... 235/380, 379, 235/375, 492, 493

[56] References Cited

U.S. PATENT DOCUMENTS

| | | | |
|---|---|---|---|
| 4,055,746 | 10/1977 | Peterson | 235/380 |
| 4,334,278 | 6/1982 | Marmon | 364/709 |
| 4,446,528 | 5/1984 | Marmon | 364/709 |
| 4,634,845 | 1/1987 | Hale et al. | 235/379 X |
| 4,678,895 | 7/1987 | Tateisi et al. | 235/379 |
| 4,684,791 | 8/1987 | Bito | 235/380 |
| 4,700,055 | 10/1987 | Kashkashian, Jr. | 235/380 X |
| 4,797,543 | 1/1989 | Watanabe | 235/482 |
| 4,801,787 | 1/1989 | Suzuki | 235/380 |
| 4,810,868 | 3/1989 | Drexler | 235/487 |
| 4,882,473 | 11/1989 | Bergeron et al. | 235/380 |
| 4,882,675 | 11/1989 | Nichtberger et al. | 364/401 |
| 5,012,077 | 4/1991 | Takano | 235/380 |
| 5,025,372 | 6/1991 | Burton et al. | 235/379 X |
| 5,101,098 | 3/1992 | Naito | 235/380 X |
| 5,192,854 | 3/1993 | Counts | 235/375 |
| 5,200,889 | 4/1993 | Mori | 364/401 |
| 5,310,997 | 5/1994 | Roach et al. | 235/375 |

FOREIGN PATENT DOCUMENTS

| | | |
|---|---|---|
| 0 253 240 A1 | 1/1998 | European Pat. Off. . |
| 4115390 | 4/1992 | Japan . |
| 93/12509 | 6/1993 | WIPO . |

*Primary Examiner*—Michael G. Lee
*Attorney, Agent, or Firm*—Staas & Halsey

[57] ABSTRACT

A card terminal for settling transactions with a prepaid card or a credit card using comprising a card reader for reading data out of the card, a data writer for writing data on the card, a display for indicating the customer's data, transaction data, and stamp points, and a keyboard for inputting sales data, customer's data, or stamp point data. The card terminal has at least one of the functions from among inquiring about the transaction, cancellation of the transaction, purchase of commodities, calculation of the service points in accordance with an amount of transaction, display of the personal anniversary of the customer, and writing the details of a transaction, the service points, or personal data, even if the card is prepaid card or a credit card. The service point can be increased in accordance with the convenience of the stores, such as a bonus sales and customer's anniversary, by setting a multiple at the card terminal. These multiple functions are automatically and systematically achieved, to realize improved service and quick efficient business.

19 Claims, 13 Drawing Sheets

Fig.3
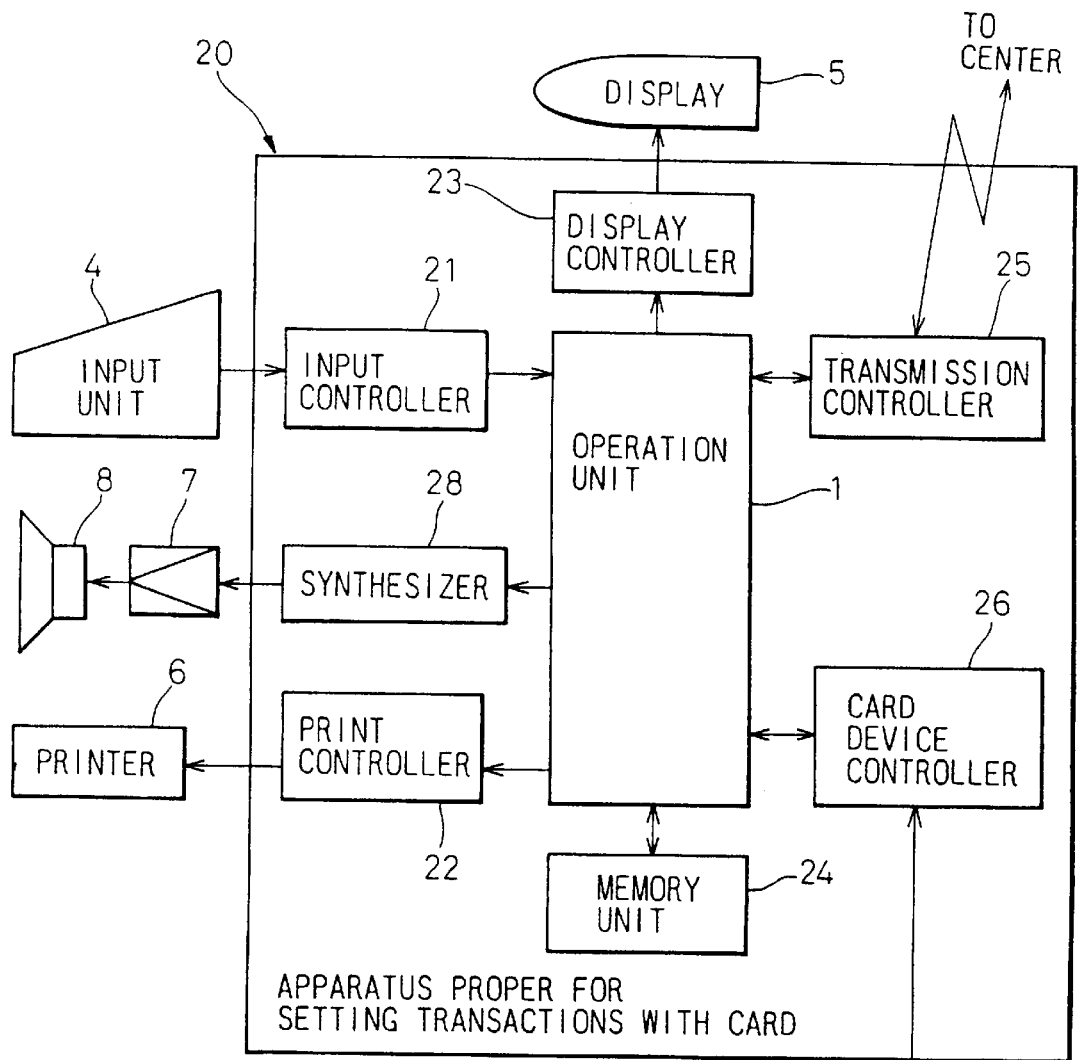
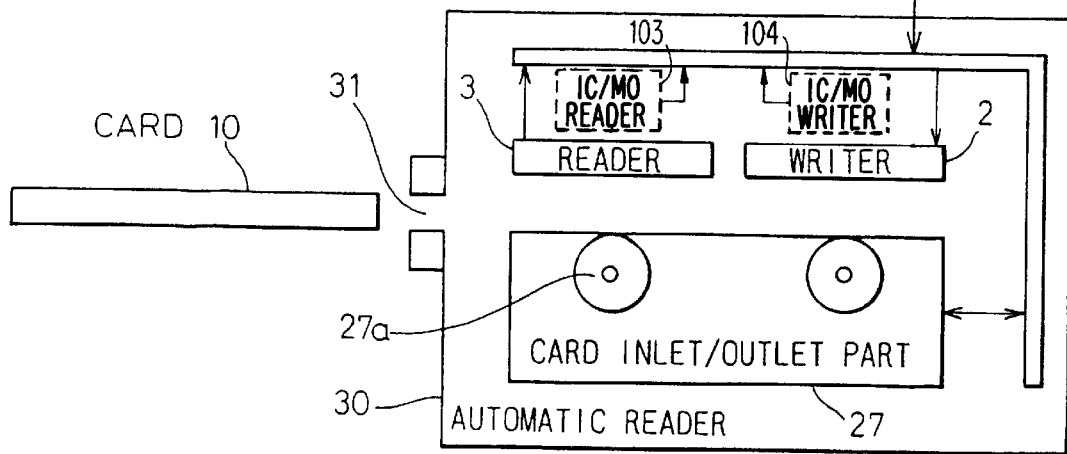

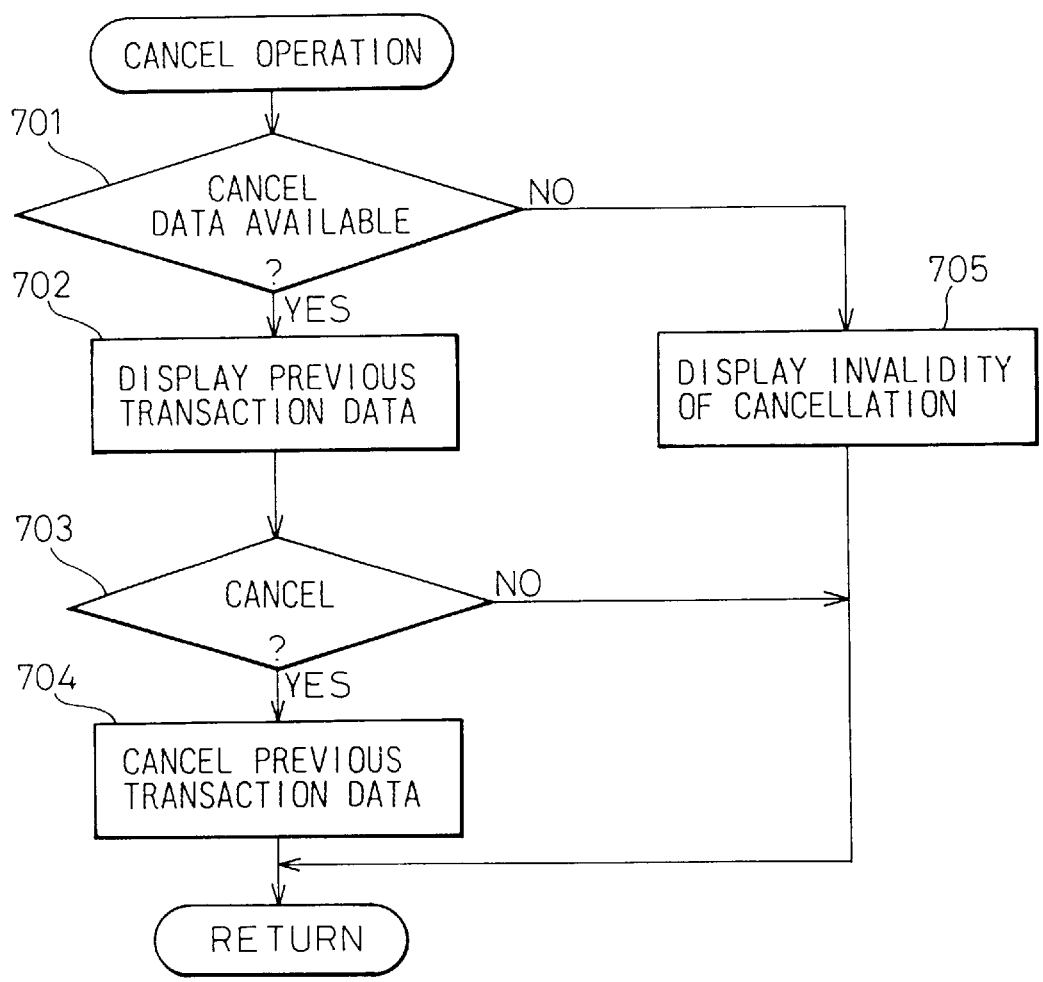

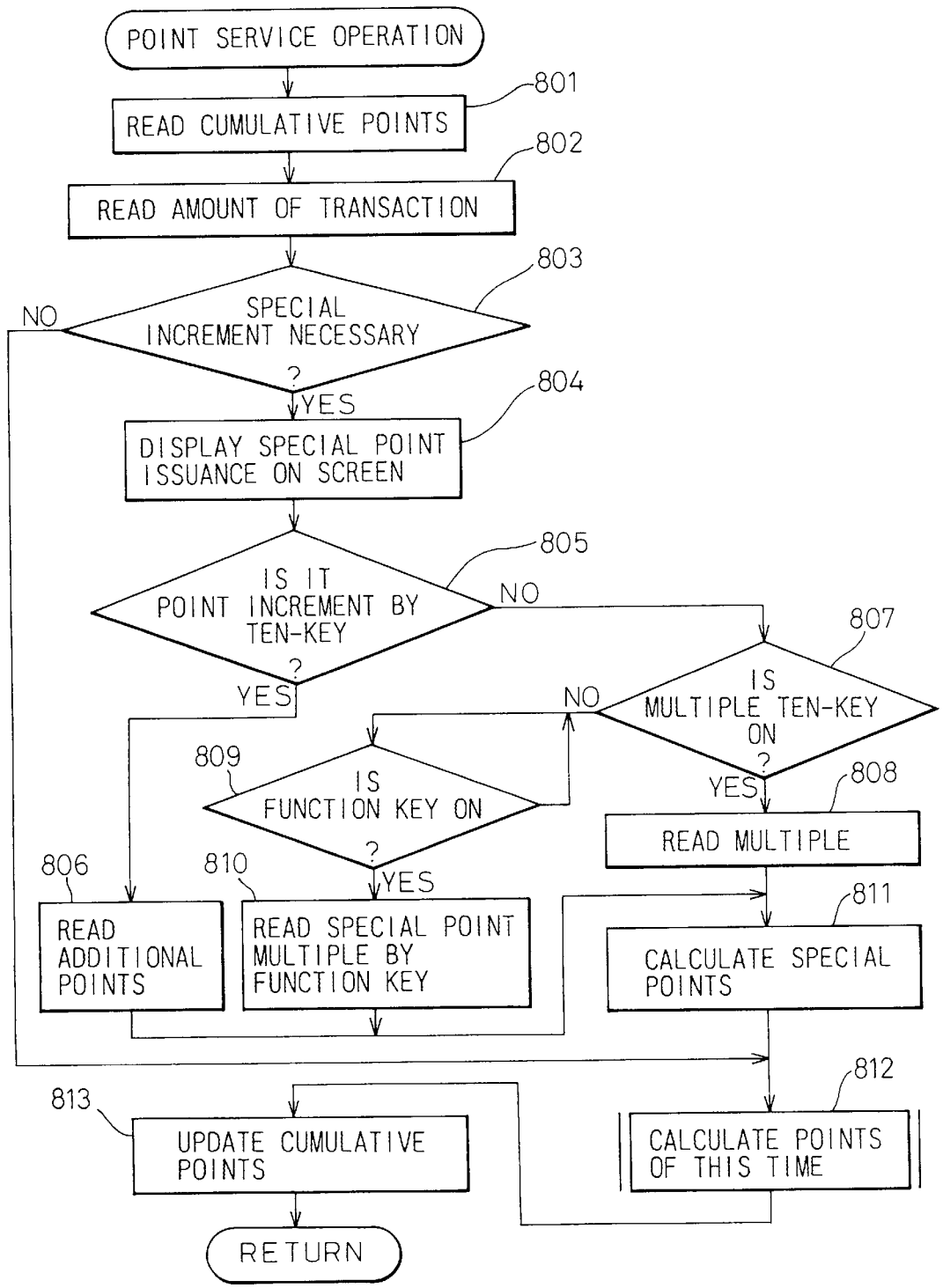

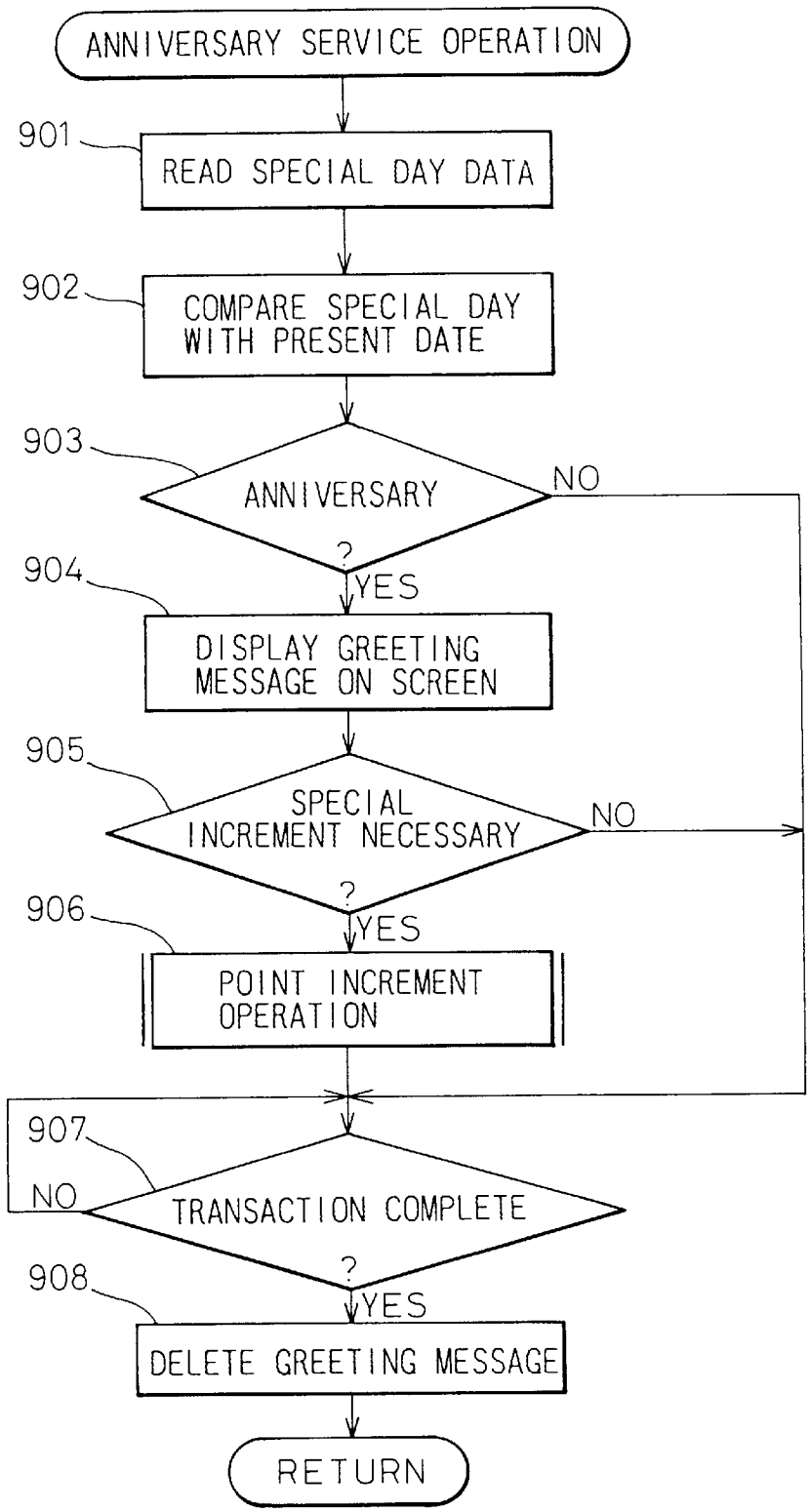

Fig.11A

```
STAMP                        SALES
**ENTER MULTIPLE IF SPECIAL
  POINTS ARE ISSUED          5,000 YEN
    ISSUANCE(STANDARD)          50 POINTS

TOTAL STAMPS                 450 POINTS
MULTIPLE  ×2    ×3    ×4    ×5
```

| F 1 | F 2 | F 3 | F 4 | F 5 |

⇧ ⇧
PRESSED

Fig.11B

```
  STAMPS                       SALES
                              5,000 YEN

ISSUANCE(STANDARD)          50 POINTS
  SPECIAL POINTS (×3)          150 POINTS

TOTAL STAMPS                 550 POINTS
MULTIPLE  ×2    ×3    ×4    ×5
```

| F 1 | F 2 | F 3 | F 4 | F 5 |

Fig.12

| NAME OF ITEM | CONTENTS |
|---|---|
| TEN-KEY INPUT UNIT | ENTER POINTS BY TEN-KEY OR MULTIPLE |
| AVAILABILITY OF F1 KEY | 01 : AVAILABLE    02 : UNAVAILABLE |
| MULTIPLE FOR F1 KEY | 00 TIMES ( DEFAULT VALUE ) |
| AVAILABILITY OF F2 KEY | 01 : AVAILABLE    02 : UNAVAILABLE |
| MULTIPLE FOR F2 KEY | 00 TIMES ( DEFAULT VALUE ) |
| AVAILABILITY OF F3 KEY | 01 : AVAILABLE    02 : UNAVAILABLE |
| MULTIPLE FOR F3 KEY | 00 TIMES ( DEFAULT VALUE ) |
| AVAILABILITY OF F4 KEY | 01 : AVAILABLE    02 : UNAVAILABLE |
| MULTIPLE FOR F4 KEY | 00 TIMES ( DEFAULT VALUE ) |
| AVAILABILITY OF F5 KEY | 01 : AVAILABLE    02 : UNAVAILABLE |
| MULTIPLE FOR F5 KEY | 00 TIMES ( DEFAULT VALUE ) |

Fig.13A

```
STAMP                    SALES

*READ CARD

```
STAMPS ★★              SALES

*ENTER AMOUNT OF MONEY

★★ TODAY IS A CUSTOMER'S BIRTHDAY ! !
```
[F 1] [F 2] [F 3] [F 4] [F 5]

# APPARATUS FOR SETTLING TRANSACTIONS WITH CARD

This application is a continuation of application Ser. No. 08/247,756, filed May 23, 1994, now abandoned.

BACKGROUND OF THE INVENTION

1. Field of the invention

The present invention relates to an apparatus for settling transactions with a card such as a credit card, a prepaid card, or a service point card that provides various services, and effectively uses the functions of the card.

2. Description of the Related Art

Recently, various kinds of prepaid or credit cards, having at least one magnetic stripe thereon, are used in a variety of ways. These cards are issued by department stores either solo or in cooperation with credit companies, by chain or group speciality shops, by small shops, or by shop associations.

Apparatuses for settling transactions with such a variety of cards are required to have not only a function of handling the cards but also additional service functions to provide more services for card users, promote the use of the cards, and extend the usage of the cards in different fields.

For example, instead of a conventional stamping service on the stamp sheet as a coupon or a reward for cash transactions, service points will be recorded in the magnetic stripe according to the amount of payment or the number of transactions. When the points reach a predetermined number, the customer may receive a bonus present. Special points may be granted to customers on their special days such as birthdays or a wedding anniversaries.

To provide the apparatuses with such functions, necessary data must be stored in individual cards. As the amount of data to be stored in the cards increases, the apparatuses become more complicated. It is therefore required, in order to automatically and systematically carry out the functions, to make the apparatuses simpler and more efficient.

Conventional apparatuses for settling transactions with a card, having a plurality of functions require different operations function by function. Namely, conventional apparatuses require complicated inefficient operations.

For example, transactions with cards always involve cancellations and inquires. The conventional apparatuses may settle a transaction with a card but they never record the details of the transaction in the card.

When a customer asks to return or exchange a purchased commodity due to a mistake in the kind or size of the commodity, a seller must check the commodity and a receipt brought by the customer and manually correct the amount of payment and points according to the receipt.

Although credit transactions and service points are closely related to each other, the conventional apparatuses handle them separately. When one function is complete on a card, the apparatuses discharge the card, which must be again inserted into the apparatuses to carry out the next function.

In this way, the conventional apparatuses require complicated processes of reading a card and entering the amount of money and this prolongs a customer's waiting time. This is disadvantageous in customer service. The apparatuses must be improved on these points, to increase business efficacy and improve customer service.

The apparatuses for settling transactions with a card must have various functions according to applications. For example, the rate of issuing service points must be changed on customers' birthdays and shop's special bargain days, or according to payment terms such as cash, credit, one lump sum payment, installment plan, and revolving payment.

The conventional apparatus issues standard points, and if required, adds special points to the standard points. When a special multiple must be applied to the standard points, an operator must manually multiply the standard points by the multiple and enters the points into the apparatus. Such a manual operation is troublesome for the operator.

To issue the special points, the operator must change a point issuance rate after the completion of the present process and carry out the next process. This complicates the operator's work and decreases operability.

Multiples for calculating special points differ from shop to shop. Accordingly, if the apparatuses are provided with fixed multiples, they will not be versatile.

To provide a distinctive service, there is an attempt to print, for example, "*Happy birthday*" on a receipt or a slip on a customer's birthday. According to the conventional technology, an operator knows such special day only after payment is settled and a receipt is printed. Accordingly, it is difficult for the operator to quickly and positively provide the customer with special service such as giving special points on the customer's special day.

SUMMARY OF THE INVENTION

The object of the present invention is to provide an apparatus for settling transactions with a card, having automated and systematized functions to simply and quickly settle the transactions, improve service, and promote business efficacy.

According to the fundamental aspect of the present invention, there is provided an apparatus installed for a cashier of the store, restaurant, and the like for settling transactions with a credit card or a prepaid card, comprising data read means for reading recorded data out of a card, data store means for temporary storing the data read by the data read means, display means for displaying the data, data input means for inputting data concerning an amount of transaction or customer's personal data, data communication means for executing a data communication between the transaction apparatus and a credit company, write means for writing data into the card; and control means for controlling the write means, data read means, data input means, display means, data store means, and data communicate means, wherein the transaction apparatus can operate at least one of the function among inquiry of the transaction, cancellation of the transaction, purchase of commodities, calculation of the service point in accordance with an amount of transaction, display of any anniversary of the customer, and write of the details of a transaction, a service point, or a personal data, even if the card is prepaid card or a credit card.

Also, according to the first modified aspect of the present invention, there is provided an apparatus for settling transactions with a card comprising, read means for reading data out of a card, write means for writing data into the card, and operation means for settling a transaction. The details of the transaction settled by the operation means are written into the card by the write means. The read means reads the details of a previous transaction out of the card. According to the read data, the operation means cancels or inquires the transaction. If the operation means cancels the transaction, the write means writes cancellation data on the transaction details into the card.

According to the second modified aspect of the present invention, there is provided an apparatus for settling transactions with a card having a function of issuing points according to the amount of a transaction and automatically calculating cumulative points after settling payment, comprising a read means for reading cumulative points out of the card, an operation means for adding points to be issued according to the amount of a transaction to the cumulative points, and a write means for writing the total points calculated by the operation means into the card. This apparatus issues points according to the amount of a transaction. The operation means settles payment for the transaction and adds the points of the transaction to present cumulative points read by read means. The write means writes the total points into a card. The read means reads the cumulative points written by the write means out of the card. This apparatus automatically carries out the point process after the payment settling process.

According to the third modified aspect of the present invention, there is provided an apparatus for settling transactions with a card, capable of issuing multiples or special points, in addition to the aforementioned apparatus. Accordingly, this apparatus further comprises a multiple setting means for setting a multiple used for calculating points according to the amount of a transaction, and operation means for issuing points according to the multiple set by the multiple setting means and adding the issued points to cumulative points. The multiple setting means is capable of setting a plurality of multiples or an optional rate for issuing points.

According to the fourth modified aspect of the present invention, there is provided an apparatus for settling transactions with a card, capable of informing an operator of a customer's special day after the start of a transaction, in addition to the aforementioned apparatus. Accordingly, this apparatus further comprises a read means for reading an attribute indicating a customer's special day out of a card, special day checking means for checking the special day read by the read means, and message display means for displaying a message indicating the customer's special day according to a result of the check by the special day checking means.

A transaction with a card often involves a cancellation of or an inquiry against the transaction. If data of a preceding transaction are automatically read out of the card, an operator can easily carry out the cancellation or inquiry work with no receipt or bill.

The first modified aspect of the present invention reads the details of a previous transaction out of the card and cancels or inquires against, the transaction according to the read data. This eliminates manually entering the data, and therefore, correctly cancels or checks the transaction within a short time.

The card used to settle payment for commodities and services and issue points has a magnetic stripe. The write means records the details of a transaction and points into the magnetic stripe of the card.

To cancel or inquire against a transaction and correct the points accordingly, the read means reads data of the transaction out of the card without a slip or a receipt. According to the read data, an operator knows the details such as date and amount of the transaction. The operator is not required to repeatedly enter the data of the transaction. As a result, work load on the operator is reduced.

Since it is not necessary to print the data on a slip or a receipt, time is saved and business is made simpler and more efficient.

The apparatus for settling transactions with a card according to the second modified aspect of the present invention correctly and quickly provides points when a purchase of commodities and services is settled with a card having a magnetic stripe that is capable of storing cumulative points.

When the card is inserted into the apparatus, the read means reads data out of the card, and the operation means settles a purchase transaction.

The read means reads cumulative points out of the card. The operation means adds points corresponding to the amount of the purchase to the cumulative points, and the write means writes the updated total points into the card. Thereafter, the card is discharged.

In this way, the apparatus according to the present invention settles a transaction with a card and automatically records cumulative points according to the transaction into the card. Unlike the prior art, the present invention eliminates manually entering data in calculating points, to thereby efficiently settle transactions, shorten a customer's waiting time, and prevent human errors.

Note that the card may be a credit card that stores points, or a prepaid card.

The third modified aspect of the present invention employs the multiple setting means. When the apparatus is started or when the multiple used for issuing special points must be updated, the multiple setting means sets multiples in preset items in a preset file, to assign the multiples to function keys of the apparatus. When the preset file is loaded, the multiples are assigned to the function keys, respectively.

In this way, a plurality of multiples can be set to the function keys, respectively. The multiple setting means is capable of setting optional multiples. When issuing special points to a customer, an operator can select one of the multiples.

Accordingly, the third modified aspect of the present invention simplifies the operation of issuing special points and is flexible and applicable to a variety of special point issuing methods.

The fourth modified aspect of the present invention informs the operator of a customer's special day such as a birthday, to let the operator provide quick and positive service.

When the card is inserted into the apparatus, the read means reads a customer's attribute out of an attribute field of the card. The special day checking means compares the read attribute with day data stored in the apparatus. If the read data agree with a special day, the display means displays a message to inform the operator of the special day.

On the customer's special memorial day such as a birthday or a wedding anniversary, a message of, for example, "Happy birthday" is displayed to congratulate the customer, and at the same time, let the operator know of the customer's special day. The message lasts until points are issued.

During the transaction, the operator can anytime know the customer's special day, so that the operator may issue special points or service commodities. In this way, positive service is provided to customers on their special days, and special communications will be made with the customers on the days, to promote sales.

BRIEF DESCRIPTION OF THE DRAWINGS

The present invention will be more clearly understood from the description as set forth below with reference to the accompanying drawings, wherein:

FIG. 3 is a block diagram showing an inner construction of an apparatus for settling transactions with a card shown in FIG. 1;

FIG. 7 is a detailed flowchart showing one example of a cancel operation step of the general flowchart in FIG. 5;

FIG. 8 is a detailed flowchart showing one example of a point service operation step of the general flowchart in FIG. 5;

FIG. 9 is a detailed flowchart showing one example of an anniversary service operation step of the general flowchart in FIG. 5;

FIG. 11A shows an example of a screen displaying multiples to be entered to issue special points according to the present invention;

FIG. 11B shows an example of a screen display after the function key F2 in FIG. 11A is pressed;

FIG. 12 is a table showing examples of preset items for setting multiples to issue special points according to the present invention;

FIG. 13A shows an example of a screen display before the card is inserted according to the present invention; and FIG. 13B shows an example of a screen displaying a customer's special day after the card is inserted according to the present invention.

DESCRIPTION OF THE PREFERRED EMBODIMENTS

Figure 1:
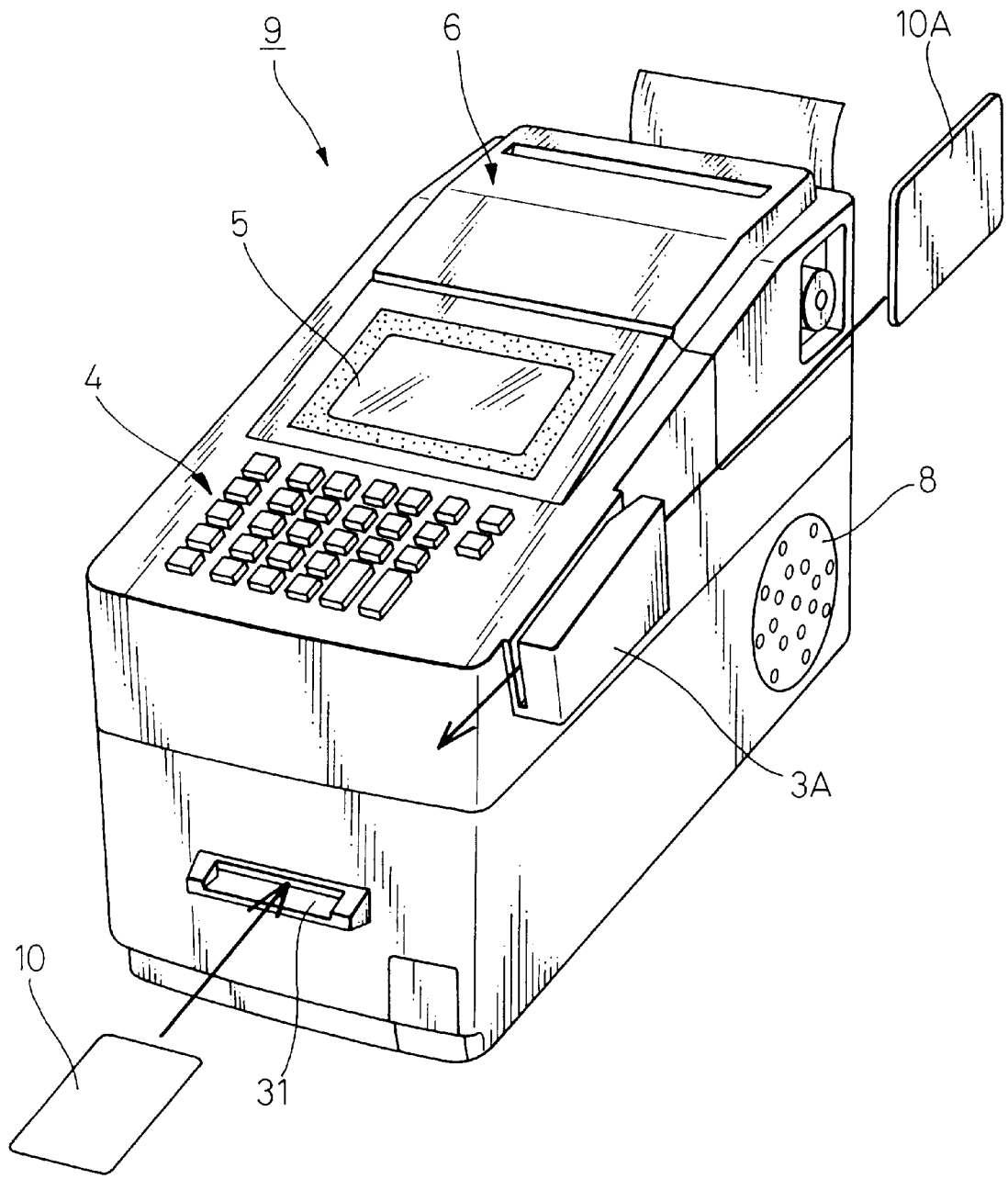
FIG. 1 is a perspective side view showing one embodiment of an apparatus for settling transactions with cards according to the present invention.

FIG. 1 is a perspective side view showing one embodiment of a card terminal 9 containing an apparatus for settling transactions with cards therein according to the present invention. In FIG. 1, reference 3A denotes a credit card reader, 4 denotes an input unit including numeric key pad and function keys, 5 denotes a display, 6 denotes a printer for printing a credit slip or a receipt, 8 denotes a speaker, 10 denotes a polyethylene terephthalate (PET) card, 10A denotes a credit card made of plastic plate, and 31 denotes a slot of for automatic reader.

The PET card 10 is usually used for a prepaid card and is inserted into the slot 31 to read data. The credit card is usually made of plastic plate having at least one magnetic stripe printed thereon and can be used as a prepaid card if the magnetic stripe for it is provided thereon. The credit card is slid along a groove in the credit card reader 3A to read data.

Figure 2A:
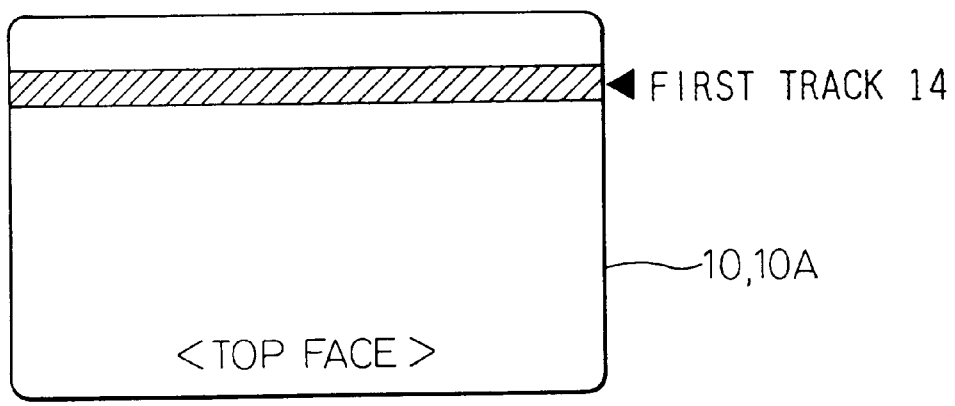
FIG. 2A is a plan view of a credit card or a PET card having a magnetic stripe on top face thereof.
Figure 2B:
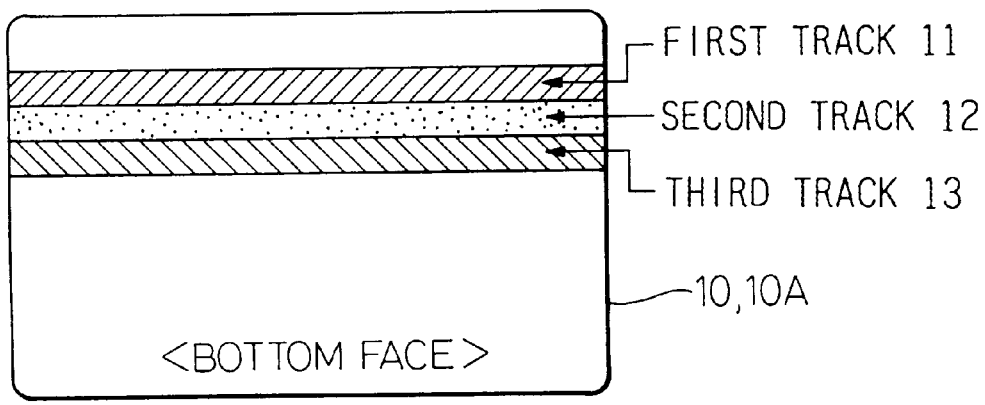
FIG. 2B is a bottom view of a credit card or a PET card having three magnetic stripes on bottom face thereof.

FIG. 2A is a plan view of a credit card 10A or a PET card 10 having a magnetic stripe 14 on the top face thereof, and FIG. 2B is a bottom view of a credit card or a PET card 10 having three magnetic stripes 11, 12, and 13 on the bottom face thereof. Generally, the first track 14 on the top face of the card 10, 10A is used for domestic credit transactions or an identification code for a bank card, the first track 11 on the bottom face is used for an international credit transactions, the second track 12 on the bottom face is used similar to the first track 14, and the third track 13 on the bottom face is used for a prepaid card or a stamping service.

FIG. 3 is a block diagram showing a construction of an apparatus 20 for settling transactions with a card provided in the card terminal 9 shown in FIG. 1.

The apparatus 20 has an operation unit 1, an input controller 21, a print controller 22, a display controller 23, a memory unit 24, a transmission controller 25, a card device controller 26, and a synthesizer 28. The apparatus 20 is connected to an input unit 4, a display 5, a printer 6, a speaker 8 through an amplifier 7 and an automatic card reader 30 capable of reading a PET card, a credit card 10a, an IC card or a magnetooptic card using the IC/MO reader 103 and IC/MO writer 104, both of which are known in the art. In this embodiment, the automatic card reader 30 reads the PET card. The construction of a card reader for the credit card 10A is similar to the automatic card reader 30, so that the illustration and the explanation thereof is omitted in this embodiment.

Note that, the automatic card reader 30 can also read the credit card 10A when it is designed to do so.

The operation unit 1 settles payment transactions and controls the apparatus 20 as a whole.

The operation unit 1 calculates the amount of sales entered through the input unit 4, reads balance data and cumulative points out of a card 10 inserted into the automatic reader 30, settles payment, and carries out a point service.

The aforementioned multiple setting means 7 of the third aspect of the present invention and the special day checking means 9 of the fourth aspect of the present invention are prepared in the operation unit 1.

The input unit 4 may be a keyboard as shown in FIG. 1 or a bar code reader operated by an operator to enter necessary data. The input unit 4 is used to enter data and conditions for achieving functions and restoring data.

The input controller 21, which is connected to the input unit 4, controls data provided through the keyboard, to achieve predetermined functions and transmit data to and from the operation unit 1.

The printer 6, which is connected to the printer controller 22, prints necessary information such as the names, unit prices, quantities, and total amount of commodities, tax, and cumulative points on a receipt or a small card to be handed over to a customer. A message about a customer's special day will be printed to congratulate the customer. The contents of linked processes will also be printed and visually confirmed.

The print controller 22 transmits signals between the operation unit 1 and the printer 6, to control the printer 6 to print and issue receipts.

The display 5, which is connected to the display controller 23, may be a CRT (cathode ray tube) or a LCD (liquid crystal display) to display various input data such as the names, quantities, unit prices, and total amount of commodities during the operation of the apparatus. The display 5 also displays messages for an operator, such as the conditions of the apparatus, operations to be selected, and the next step to be taken.

Data displayed also include a presently achieved function, linked functions, and a notice of executing the linked functions. A linked function is a function for executing next operation without ejecting the card.

The display controller 23 controls signals between the display 5 and the operation unit 1. The display controller 23 controls the display 5 to display the contents of the presently achieved function and data related to a predetermined function to be executed after the present function. The aforementioned message display means 8 of the fourth aspect of the present invention is contained in the display controller 23.

The transmission controller 25 transmits data to and from a computer center having a mainframe computer or a host computer, and controls credit information. Data communication between the apparatus and the computer center center is carried out through the transmission controller 25.

The memory unit 24 includes a ROM which stores programs for operating the apparatus 20 and a RAM for temporarily storing preset data sent from the computer center, data related to sales, and data to be printed. The programs stored in the ROM are loaded to the RAM, and according to the programs, the operation unit 1 controls the apparatus 20 as a whole.

The memory unit 24 temporarily stores sales data, data stored in the card 10, and data to be printed on a receipt or the card 10. Note that, the data can be printed on the PET card but cannot be printed on the plastic credit card. The memory unit 24 also stores data related to the presently achieved function, flags used to process cumulative points according to the aforementioned second aspect of the present invention, and sequences and data for carrying out other functions.

The synthesizer can generate a music suitable for celebrating a customer's birthday or a wedding anniversary in accordance with musical notes stored in the memory unit 24 when the operation unit 1 detects the customer's anniversary. The generated music is amplified at the amplifier 7 and emitted from the speaker 8.

The automatic reader 30, connected to the card device controller 26, writes and reads data to and from a magnetic stripe formed at a predetermined position on the card 10 that is passed through the automatic reader 30. The data thus read is transferred to the apparatus 30 and processed according to the programs.

The automatic reader 30 has a card inlet/outlet part 27, a reader 3, and a writer 2. The automatic reader 30 is connected to the operation unit 1 through the card device controller 26. The card inlet/outlet part 27 has rollers 27a for pulling in the card 10 when the card 10 is inserted into the slot 31 and for ejecting the card 10 after the operation.

The reader 3 reads transaction specific data out of a card 10 to identify the customer. The specific and transaction data are temporarily stored in the RAM and read by the operation unit 1 when required to settle transactions. Reading a customer's attribute according to the fourth aspect of the present invention is carried out by the reader 3.

The writer 2 writes a result of a transaction and points settled and calculated by the operation unit 1 into the card 10. The apparatus 30 usually handles magnetic cards. Magnetooptic cards to be read with laser beams are also employable. Cards having perforations or printed marks serving as a visible sign of limit of use are also employable.

The card inlet/outlet part 27 is a known arrangement that receives and discharges the card 10 in response to control signals from the operation unit 1.

The card device controller 26 controls the reader 3, writer 2, and card inlet/outlet part 27 so that they provide their individual functions. The controller 26 also controls data between the operation unit 1 and the automatic reader 30.

According to this embodiment, the card 10 is a magnetic card as shown in FIGS. 2A and 2B having a magnetic stripe 11–14 for storing customer's data such as an ID number, a face value, a balance, a date, and cumulative points.

The card 10 is not necessarily a magnetic card. Any portable storage medium such as an IC card (=a card in which an integrated circuit is installed) that is readable and writable is employable.

Figure 4:
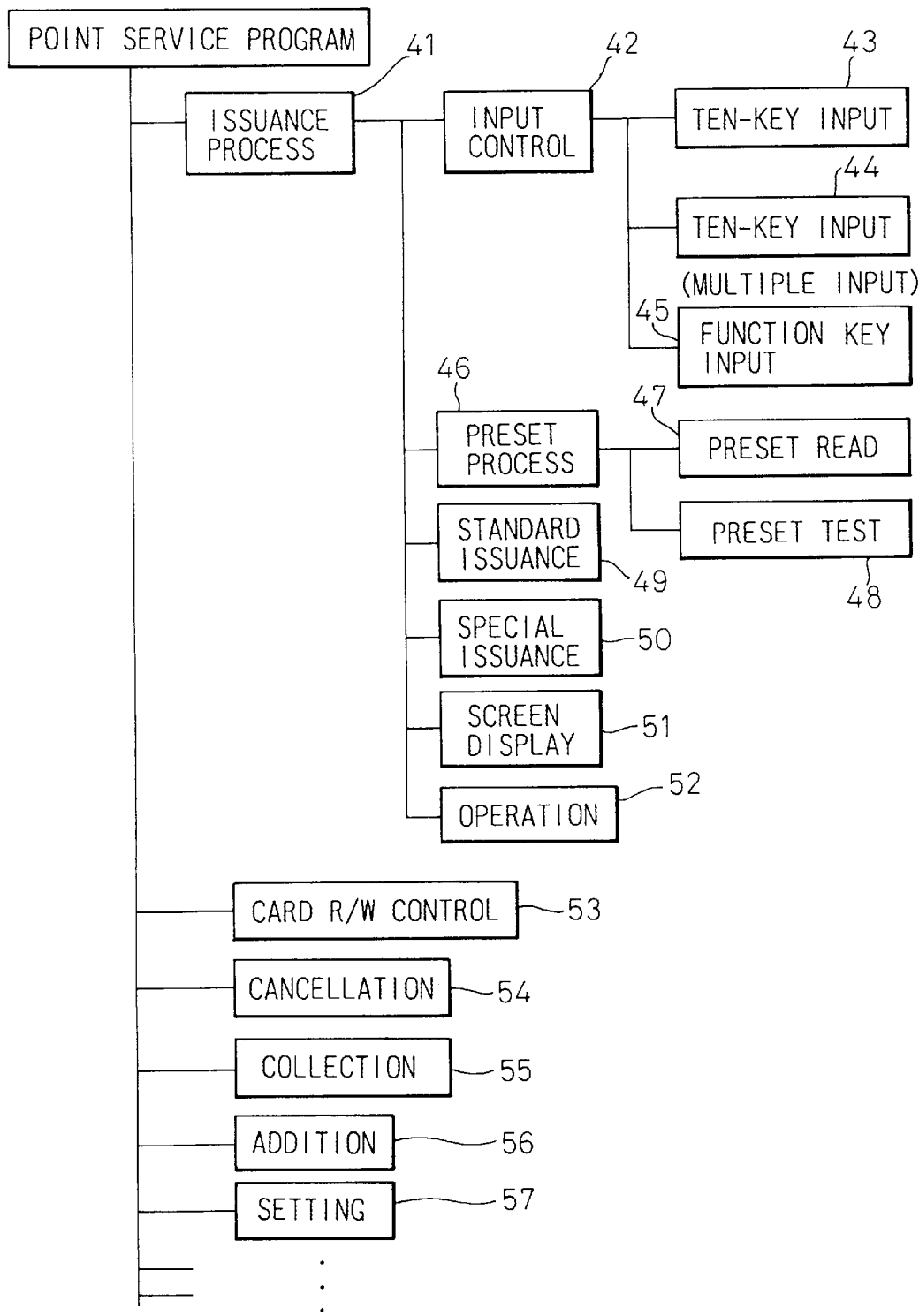
FIG. 4 shows one example of a software arrangement for entering a multiple to issue special points stored in a memory unit in FIG. 3.

FIG. 4 shows an organization chart for software stored in the memory unit 24 according to the present invention.

A setting routine 57 is started to carry out initialization when a power source is turned on or when keys are operated to change multiples for issuing special points. At this time, preset items described later, are read to set multiples used for point service.

After a transaction is processed and payment is settled, a point issuance routine 41 is started.

A standard point issuance routine 49 and an operation routine 52 calculate standard points. A display 51 displays the amount of the payment, the standard points, and key assignment for the multiples for issuing special points.

An input control routine 42 is started, and an operator enters multiples for issuing special points with a numeric key 43, a numeric key 44, or a function key 45 while observing the display.

The input control routine 42 is a program for entering unit prices and quantities with a numeric key pad pad and function keys. The input control routine 42 selects the numeric key 43 to enter special points, the numeric key 44 to enter multiples, or the function key 45 to enter multiples.

When a preset routine 46 is started, a preset read routine 47 reads the entered point data and a preset test routine 48 tests the point data. A special point issuance routine 50 and the operation routine 52 calculate special points to be issued, and the display 51 displays the points.

A write program (not shown) writes the points into the card. If necessary, the points are printed on a slip or receipt, to end the process. Thereafter, the next customer's data are processed.

The content of the preset items of the preset file (which is explained later) may be changed by the setting routine 57 of the point service program, which is activated with a proper function key.

Preset data in the apparatus may be changed by starting the setting routine 57 to read the multiples out of the preset items in the preset file.

In this way, according to the present invention, the input control routine 42 additionally has the function key input routine 45 for entering multiples for issuing special points and the numeric key input routine 44 for entering multiples for issuing special points. Further, the preset process routine 46 additionally has the preset read routine 47 and preset test routine 48.

Due to these additions for entering multiples to issue special points, the display 51 and operation routine 52 are modified accordingly.

As explained above, the apparatus for settling transactions with a card according to the present invention achieves the conventional point service as well as the special point service based on optional multiples. In addition, the present invention is capable of assigning multiples to a plurality of keys, respectively, to efficiently issue special points.

Figure 5:
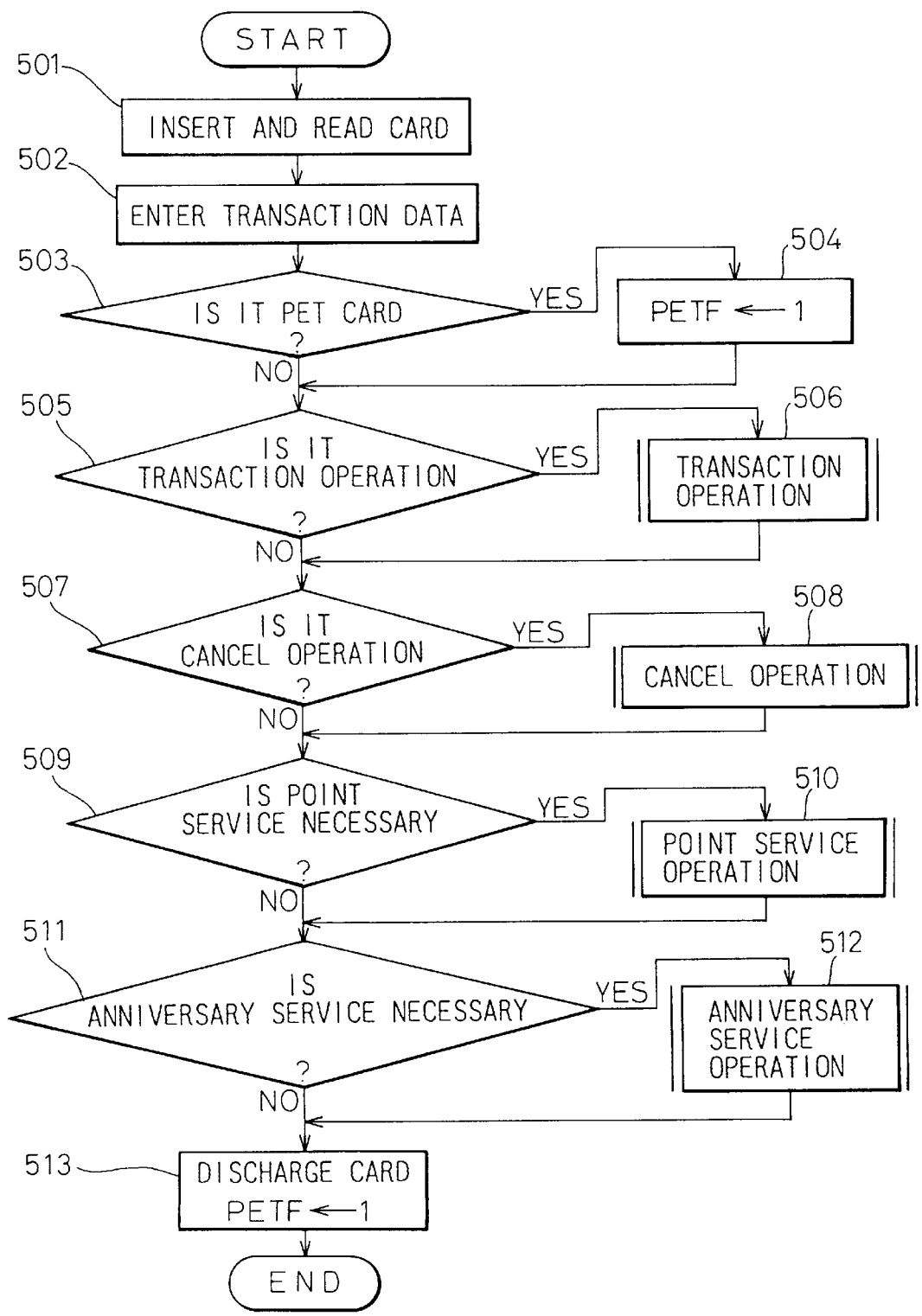
FIG. 5 is a general flowchart showing an operation of the apparatus for settling transactions with cards as shown in FIGS. 1 and 3.

FIG. 5 is a general flowchart showing an operation of the apparatus 30 for settling transactions with cards 10 and 10A as shown in FIG. 3.

The PET card 10 is inserted into the card inlet/outlet part 27, to settle a transaction. The automatic reader 30 detects the card inserted, which draws the card 10 into the automatic reader 30. Contrary to this, the credit card 10A is slid along the groove of the credit card reader 3A.

According to the programs stored in the memory unit 24, the reader 3 reads data out of the card and stores the data in the RAM of the memory unit 24 at step 501.

The read data may include a customer's ID number, a balance if it is a prepaid card, a limit amount for cash service, a validity date, and a code indicating applicable systems. The read data includes data necessary for the presently carried out function as well as data for other predetermined functions.

An operator enters transaction data with the input unit 4 at step 502. The transaction data is stored in the RAM of the memory unit 24. The entered data may include the amount and payment terms of the transaction and commodities and services involved in the transaction. This data is necessary for the present function. The entered data may include instructions to the functions linked to the present function.

The transaction data may be entered not only with the keyboard, but also an automatic reader such as a bar code reader that reads bar codes attached to commodities or printed on a list.

At step 503, it is determined whether the card read by the card terminal 9 is a PET card. If the card is the PET card 10, the control proceeds to step 504, and the flag PETF is set to "1". The flag PETF is thereafter reset to "0" at the end of the transaction.

After the determination of the card, the control proceeds to step 505. At step 505, it is determined whether the operation is a transaction. The variety of the operation is determined by the transaction data entered by the operator at step 502. If the operation is a transaction, the control proceeds to step 506 and the transaction operation is executed. Details of the transaction operation will be explained later.

After the determination of the transaction operation, the control proceeds to step 507. At step 507, it is determined whether the operation is a cancel operation. Whether the operation is a cancel operation is determined by the transaction data entered by the operator at step 502. If the operation is a cancel operation, the control proceeds to step 508 and a cancel operation is executed. The cancel operation will be explained in detail later.

After steps 507 or 508, the control proceeds to step 509. At step 509, it is determined whether or not the point service is necessary. Necessity of the point service can be set when the card terminal 9 is installed at the shop or selectable by the operator of the card terminal 9. If the point service is necessary, the control proceeds to step 510, and the point service operation is executed. The point service operation will be explained in detail later.

Then at step 511, it is determined whether the anniversary service is necessary. Necessity of the anniversary service can be set when the card terminal 9 is installed at the shop or selectable by the operator of the card terminal 9. If the anniversary service is necessary, the control proceeds to step 512. At step 512, the anniversary service operation is executed. The anniversary service operation will be explained in detail later.

When steps 501 to 512 are finished, the control proceeds to step 513. At step 513, the card is discharged from the automatic reader 30 when the card is the PET card, and then the flag PETF is set to "0".

Figure 6B:
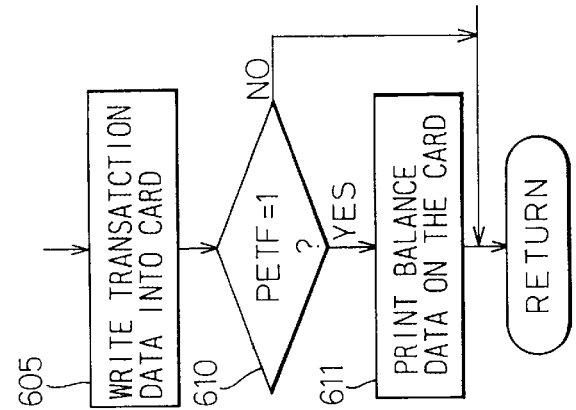
FIG. 6B is a part of flowchart showing a modification of the operation in FIG. 6A.
Figure 6A:
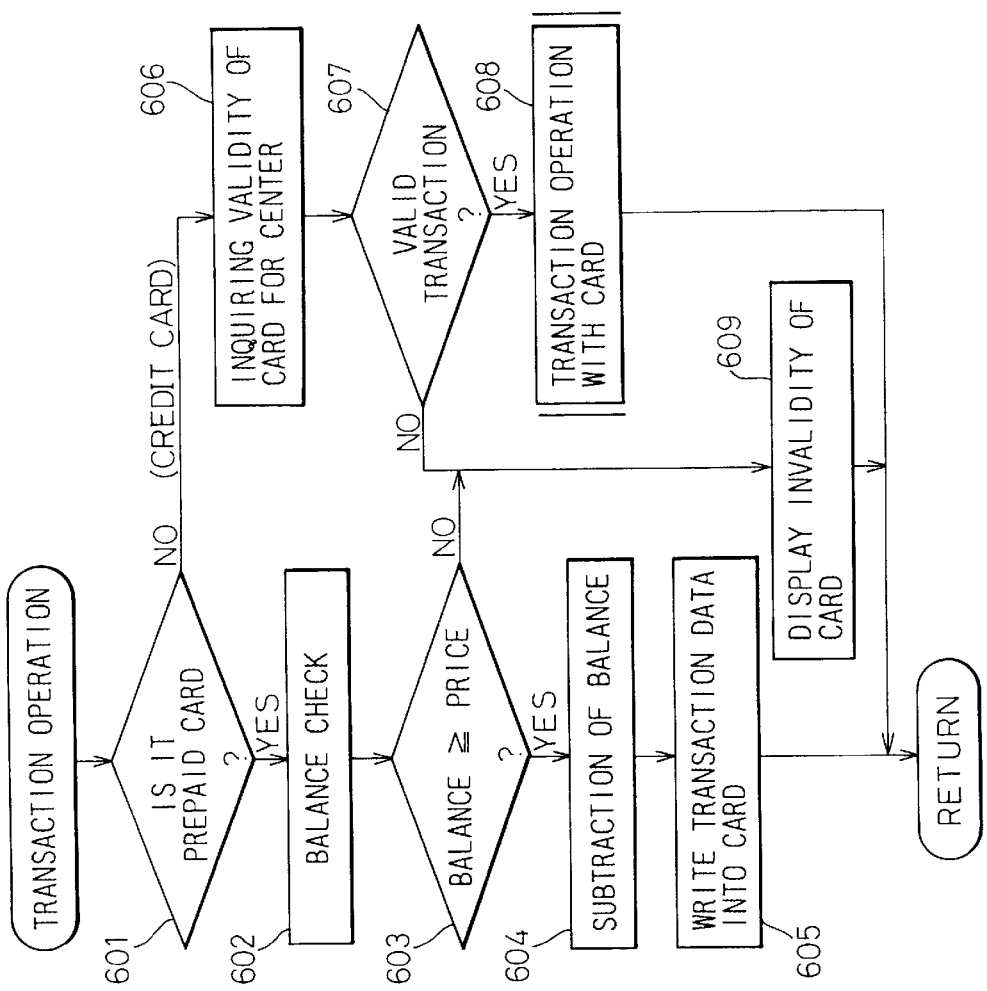
FIG. 6A is a detailed flowchart showing one example of a transaction operation step of the general flowchart in FIG. 5.

FIG. 6A is a detailed flowchart showing one example of a transaction operation step 506 of the general flowchart in FIG. 5. At step 601, it is determined whether the card is a prepaid card. If the card is a prepaid card, the control proceeds to step 602, and the balance of the card is read out from the magnetic stripe of the card.

Then at step 603, it is determined whether the balance is sufficient for the price purchased by the customer. In other word, it is determined whether the balance is larger than or equal to the price. If the balance is less than the price, the control proceeds to step 609 and the invalidity and the reason thereof are displayed on the display 5 to the operator. If the balance is larger than or equal to the price, the control proceeds to step 604 and the subtraction of the balance is executed. Then the control proceeds to step 605 and the transaction data is written into the card by the writer 2 of the automatic reader 30. Namely, the writer 2 reads the transaction data out of the memory unit 24 and writes the date, time, and amount of the transaction as well as the codes and unit prices of the commodities into the card 10.

Contrary to this, if the card is a credit card, the control proceeds to step 606 from step 601. At step 606, the credit card is checked to see if the card is a valid credit card by communicating with the computer center of the credit company.

Then, at step 607, it is determined whether the transaction is valid. When the transaction is valid, the control proceeds to step 608 and the transaction operation with card is executed. But if the transaction is not valid, the control proceeds to step 609 and displays the invalidity of the card on the display 5.

Usually, a transaction operation is executed between the credit company and the bank when the credit card is determined to be valid. However, the transaction data can be recorded on the credit card, if the credit card is inserted to the automatic reader 30 of the card terminal 9. In this case, an indication to insert the credit card 10A into the automatic reader 30 is displayed on the display 5 of the card terminal 9, and the operator inserts the credit card 10A into the automatic reader 9.

After the completion of steps 605, 609, or 608, the control proceeds to step 507 in FIG. 5.

According to the present invention, the writer 2 writes the details of the transaction onto the PET card 10 or the credit card. These details are used for a cancellation or an inquiry. The storage capacity of the card 10 or 10A determines the quantity of the details stored in the card 10 or 10A.

If the storage capacity of the card 10 or 10A is small, the date, time, and amount of a previous transaction will be stored in the card to enable a cancellation. To save labor and promote automation, it is preferable that the card has a capacity of storing the codes, unit prices, and quantities of purchased commodities.

FIG. 6B is a modification of the operation as explained in FIG. 6A. In FIG. 6B, steps 610 and 611 are added after step 605. At step 610, it is determined whether or not the flag PETF is "1". If PETF=1, the control proceeds to step 611 to print balance data on the bottom face of the PET card 10 with a printer. This printer is not shown in FIG. 2, but a thermal printer can be used to print the balance data on the bottom face of the card 10.

Next, the cancel operation will be explained with reference to a flowchart of FIG. 7.

Before step 701, the customer requests to cancel or inquire the transaction, the operator inserts the card 10 into the automatic reader 30. The reader 3 reads the details such as date and time of the transaction at steps 501 and 502.

At step 701, the validity of the card and whether transaction data exists is confirmed. That is, it is determined whether the data to be cancelled is available. When the card is a prepaid card, not only the data of the transaction but also the ID number and validity of the card are checked. When the card is a credit card, the validity and secret number of the card, the acceptability of a transaction system, and a credit line are checked. In this way, it is determined whether the transaction is valid.

If the cancel transaction is determined to be invalid, the control proceeds to step 705. At step 705, the invalidity of the cancellation is displayed. Contrary to this, if the cancel transaction is valid and if there are transaction data, the read data of the transaction are displayed on the display 5 at step 702.

An operator confirms the contents of the transaction according to the displayed data and determines whether the data can be cancelled at step 703. If the customer changes his mind or this transaction is just an inquiry of the cancellation, the cancel operation ends and the control proceeds to step 509 in FIG. 5.

If the customer confirms the displayed data and agrees to the cancellation, the operator enters cancellation data through the input unit 4 at step 703. Then the control proceeds to step 704. At step 704, previous transaction data is cancelled and the writer 2 writes the cancellation data into the card. The cancel operation ends and the control proceeds to step 509 in FIG. 5.

In this way, a previous transaction is read out of a card and cancelled or inquired without a printed slip or receipt. Namely, a customer is not requested to bring a receipt. The cancellation or inquiry is executed within a short time to improve business efficiency and customer service.

FIG. 8 is a detailed flowchart showing one example of a point service operation step 510 of the general flowchart in FIG. 5. In this operation, the apparatus 30 for settling transactions with a card automatically calculates cumulative points after settling a payment.

Before step 801, the card 10 is inserted into the automatic reader 30, and the reader 3 reads data out of the card. The read data are stored in the memory unit 24.

The read data may include a user ID number, a balance if the card is a prepaid card, a credit line for a cash service, a validity date, and a code indicating applicable systems.

At the end of the transaction, point service operation step 510 is carried out. Namely, after the settlement of payment, the reader 3 reads previous cumulative points out of the card 10 at step 801.

An operator enters the amount of transaction, that is, quantities of commodities purchased by the customer with the input unit 4 at step 802. The operation unit 1 calculates the amount of purchase. These data may be entered with not only the keyboard but also an automatic reader such as a bar code reader that reads bar codes attached to or printed on commodities.

At step 803, it is determined whether a special increment of the points is necessary. The display 5 indicates the necessity of the increment of the special points to the operator. If the indication is given by the operator that the special increment of the points is not necessary, the control proceeds to step 812.

The operation unit 1 calculates points to be issued this time according to the amount of the purchase of this time, and adds the points to the cumulative points at step 812.

Contrary to this, if the indication is given by the operator that the special increment of the points is necessary, the control proceeds to step 804, and the special point issuance is displayed on the screen of the display 5.

The operator selects a special point issuing method while viewing the screen. Accordingly, at step 805, it is determined whether the point increment is carried out by numeric key pad. Namely, it is determined whether the operator selects to enter special points with a numeric key pad.

If it is determined that the operator selects to enter special points with the numeric key pad at step 805, the control proceeds to step 806. At step 806, additional points entered with the numeric key pad will be read. Then at step 811, calculation of special points is carried out. Accordingly, any optional points can be added to the normal points by the operator.

If the operator selects to enter a multiple for calculating special points with the numeric key pad, or to enter a multiple for calculating special points with the function keys, the control proceeds to step 807 from 805.

If it is determined that the operator selects to enter a multiple for calculating special points with the numeric key pad at step 807, the control proceed to step 808, and a multiple entered with the numeric key pad will be read. According to the entered multiple, special points to be issued are calculated at step 811.

If the operator selects to enter a multiple for calculating special points with the function keys, the control proceeds to step 810 via step 809 which determines the ON of the function key. At step 810, a multiple entered with the function keys will be read. Namely, a multiple corresponding to a pushed function key is read, and according to the multiple, special points to be issued are calculated at step 811.

After step 811, calculation of total points is carried out at step 812. At step 812, the special points are added to the standard points, or the standard points are multiplied by the multiple. When the amount of purchase involves, for example, 5 standard points and when the multiple for issuing special points is 3, the special points are calculated as 3×5=15. As a result, 5+15=20 points are issued.

The standard points may be multiplied by the multiple, to calculate total points to be issued. If there are 50 standard points and if the multiple is 3, the total of 150 points will be issued. This means that there are 100 special points. These methods of issuing special points will be selected according to use.

The operation unit 1 adds the calculated points to be issued to the previous cumulative points, to find updated cumulative points at step 813. Then the writer 2 writes the updated cumulative points into the card 10.

In this way, the apparatus according to the present invention is capable of issuing special points in a conventional way. According to a key input, a multiple or points may be selectively entered.

Multiples may be allocated for the function keys, respectively, in advance through a terminal. When a shop employs several apparatuses, multiples may be downloaded from a host to the apparatuses.

Points are properly issued according to the geographical conditions of point issuing companies and shops, transaction conditions, and commodities, to improve customer service and sales efficiency.

FIG. 9 is a detailed flowchart showing one example of an anniversary service operation step 512 of the general flowchart in FIG. 5, which is for displaying a customer's special day.

Before step 901, the customer's card 10 is inserted into the apparatus 30. Data such as a customer number, cumulative points, and a customer's attribute indicating a special day are read before step 901 and stored in the memory unit 24.

At step 901, the customer's special day data, such as a birthday or a wedding anniversary is read.

The operation unit 1 compares the special day data with present date at step 902. Then at step 903, it is determined whether the present day (today) agrees with the customer's anniversary. If they do not agree with each other at step 903, it is determined that it is not the special day, and therefore, the control proceeds to step 907 without special operation.

If today is the customer's anniversary, the control proceeds to step 904 from step 903. At step 904, the operation unit 1 drives the display 5 to display greeting message on the screen thereof to inform an operator of the customer's special day.

According to the display, the operator can notice the customer's anniversary. Then at step 905, it is determined whether the special increment of the point is necessary. If the operator agrees the point increment and enters data for issuing special points, the control proceeds to step 906 to carry out the point increment operation. The point increment operation at step 906 is same as the operation at step 510, so that the explanation will be omitted. Further, according to the message on the display 5, the operator can present a commodity, or prints a message for congratulating the customer.

The message is continuously displayed until the end of the transaction, to attract attention of the operator. At step 907, it is determined whether the transaction is completed. After the completion of the transaction, the message is deleted at step 908, and the control returns to step 513 in FIG. 5.

Since the message lasts through the transaction, the operator surely knows the special day of the customer. This results in improving customer service.

Figure 10:
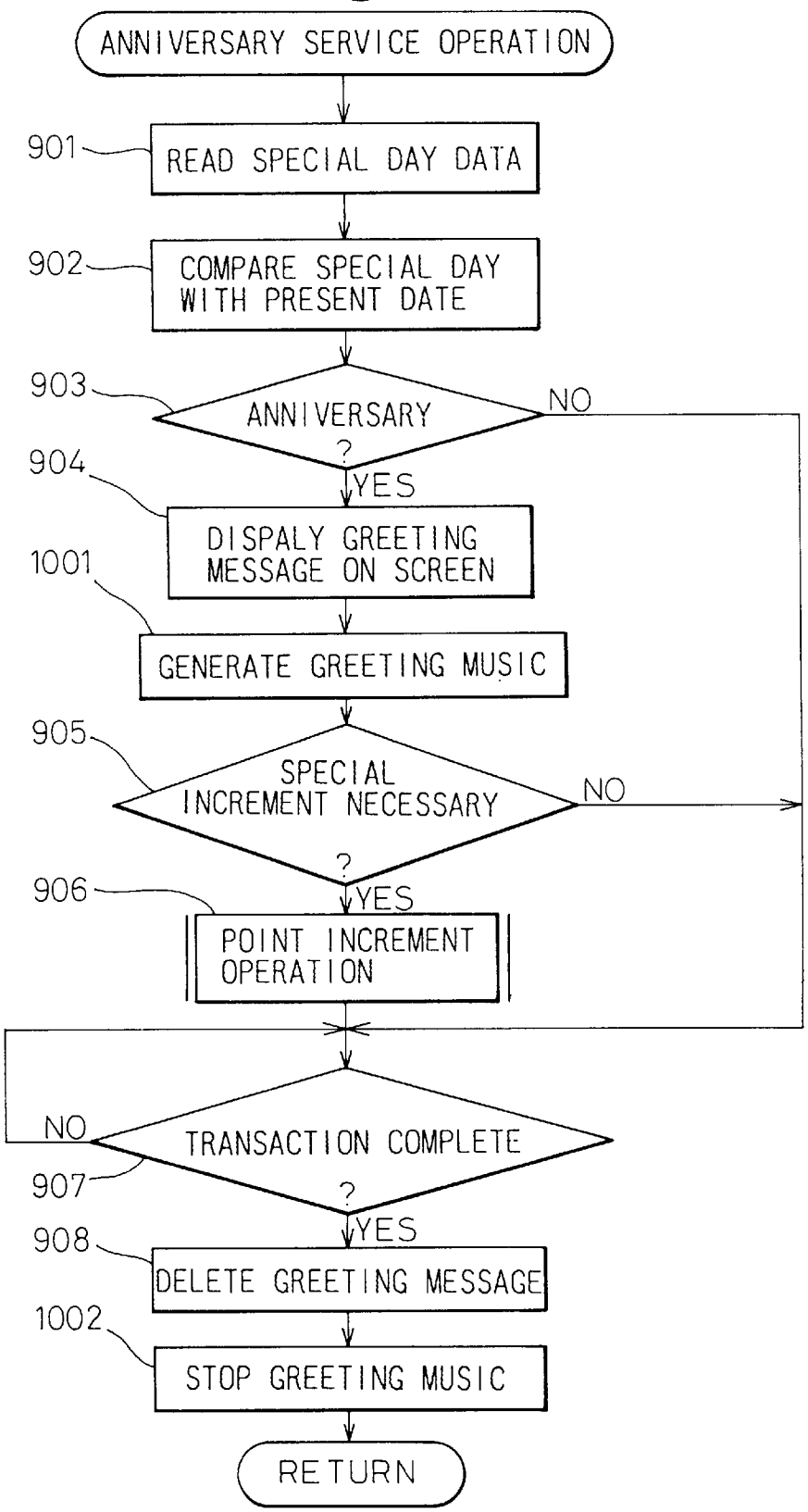
FIG. 10 is a detailed flowchart showing another example of an anniversary service operation step of the general flowchart in FIG. 5.

FIG. 10 is a detailed flowchart showing another example of an anniversary service operation step 512 of the general flowchart in FIG. 5. This operation is almost the same as the operation explained in FIG. 9, except for generating greeting music when the day is the customer's anniversary. Accordingly, only the different part of the operation will be explained in FIG. 10. The difference between the operation of FIG. 9 and 10 is the addition of steps 1001 and 1002. In FIG. 10, the step 1001 is added between steps 904 and 905 and the step 1002 is added after step 908.

In the operation of FIG. 10, greeting music is generated at step 1001, when today is the customer's anniversary. Music sounds from the speaker 8 attached on the card terminal 9 as shown in FIG. 1. By making a music, the operator can easily notice the customer's anniversary. Music stops at step 1002 after the completion of the transaction.

FIG. 11A shows an example of a screen of the display 5 for entering a multiple as explained in FIG. 8.

The screen shows the amount of sales of the present transaction (=5,000 yen), standard points (=50 points), total stamps (=450 points) and multiples (×2,×3,×4,×5) assigned to function keys F1, F2, F3, F4, respectively, to issue special points.

The multiples in the screen correspond to the function keys displayed at the bottom of the screen. In the figure, the function key F5 has no multiple. Namely, the function key F5 is unavailable.

When one of the function keys, for example the function key F2 is pressed, a corresponding multiple of three times (×3) is entered. FIG. 11B shows the screen after the function key F2 is pressed. When the function key F2 is pressed, special points becomes 150 points which is the three times as much as the standard points of 50. In this case, the total stamps becomes 550 points.

FIG. 12 is a table showing examples of preset items for setting multiples to issue special points according to the present invention.

These preset items are added into a conventional preset file. The preset items are allocated for the function keys of the apparatus for settling transactions with a card, to indicate the availability of the keys and assigned multiples, as shown in FIG. 12.

In FIG. 12, if the availability item of the key F1 is 02, the key F1 is unavailable. If it is 01, the key is available and a multiple stored in the multiple item of the key F1 is set in the RAM, to issue special points.

When a key is available and when a multiple assigned to the key is 00, the key has a default multiple for issuing special points. The default value is displayed on the display 5. If a specific value is entered for the key through the input unit 4, the entered value is assigned as a multiple to the key.

In this way, an optional value is assignable to any key, to greatly improve the applicability and flexibility of the apparatus when issuing special points.

FIG. 13A shows an example of a screen display before the card is inserted, and FIG. 13B shows an example of a screen displaying a customer's special day after the card is inserted to inform the operator of a customer's special day according to the present invention.

At the start of a transaction, usual message of *READ CARD* is displayed on the screen as shown in FIG. 13A. When a customer's special day is detected, outstanding marks such as ★★ are displayed after "ST AMP" to inform the operator of the customer's special day as shown in FIG. 13B. Further, the message "★★ TODAY IS A CUSTOMER'S BIRTHDAY !!" is displayed on the bottom line of the screen. This screen continues until the end of the transaction with the customer.

Although this embodiment employs the outstanding marks of ★★, they do not limit the displaying method of the present invention. For example, outstanding marks of ♡♡, may be displayed on a customer's wedding anniversary, and spades on a customer's birthday. Congratulating messages and simple pictures may also be displayed.

The functions of the present invention mentioned above may be separated in various ways, to provide the card transaction settling apparatus with efficiency and improved customer service.

As explained above, the present invention employs a magnetic card for settling a transaction. The present invention is capable of cancelling and inquiring a previous transaction by only reading data of the transaction off the card with no slip or receipt, to thereby shorten an operation time.

The apparatus according to the present invention settles transactions with a card that stores both credit data and cumulative points. The apparatus settles credit payment and automatically accumulates points according to the amount of the payment within a short time without bothering an operator.

According to the present invention, a multiple for issuing special points is set with one touch of a key. The present invention is also capable of setting points in the conventional manner. The present invention is able to set a plurality of multiples to provide customers with a variety of benefits, to thereby improve service quality and business efficacy.

Multiples may be set shop by shop. The apparatus according to the present invention is versatile, flexible, and easily operable in servicing points.

The function of displaying a customer's special day such as a birthday informs an operator of the special day before settling payment. Accordingly, the operator can quickly and positively provide service for the customer. This results in improving the quality of customer service and promoting sales.

The apparatus for settling transactions with a card according to the present invention has a plurality of functions and continuously carries out the functions, to eliminate the repetitive discharge and insertion of a card, the entering of data by an operator, and a time loss. The present invention relieves congestion at checkout counters during busy hours, to thereby improve service.

What is claimed is:

1. A point of sales apparatus for settling customer transactions using a card having data about a customer's identification data, cumulative service points and the customer's anniversary dates, the apparatus comprising:

an automatic card reader having a reader that reads information from said card and a writer that writes information to the card; and a controller that issues normal service points in accordance with the customer's purchase amount by directing said automatic card reader to write a new total amount of service points to said card, said controller further issuing additional service points, in addition to the normal service points, if a present date matches the customer's anniversary date recorded on the card by instructing said automatic card reader to write a new total of service points on the card.

2. An apparatus as set forth in claim 1, wherein:

the card contains a cumulative total service points earned by the customer;

the automatic card reader reads the cumulative service points of the card;

the controller calculates additional service points to be issued based on the amount of a current transaction; and the automatic card reader writes a new cumulative total service points equal to the prior cumulative total service points plus the additional service points into the card.

3. An apparatus as set forth in claim 1, wherein:

the controller sets an optional rate for issuing points.

4. An apparatus as set forth in claim 1, further comprising:

a display that displays a message recognizing the customer's anniversary date when the present date matches the customer's anniversary date.

5. An apparatus as set forth in claim 1, further comprising:

a sound synthesizer that synthesizes music based on music data; and a speaker for emitting music, wherein:

said controller selects music data suitable for the anniversary date of the customer and transmits the same to the sound synthesizer.

6. An apparatus as set forth in claim 1, wherein:

the card is a magnetic card.

7. An apparatus as set forth in claim 1, wherein:

the card is a magnetooptic card.

8. An apparatus as set forth in claim 1, wherein:

the card is an integrated circuit card.

9. A point of sales apparatus for settling customer transactions using a card having a customer's private data including past transaction data, the apparatus comprising:

an automatic card reader having a reader that reads data from the card and a writer that writes information to the card;

a data storage that stores the data read from the card;

a display that displays the past transaction data read from the card; and a controller that cancels specific transaction information selected from the past transaction data displayed on the display.

10. An apparatus as set forth in claim 9, wherein:

the card is a magnetic card.

11. An apparatus as set forth in claim 9, wherein:

the card is a magnetooptic card.

12. An apparatus as set forth in claim 9, wherein:

the card is an integrated circuit card.

13. A point of sales apparatus for settling customer transactions using a card having a customer's private data including an accumulated service points, the apparatus comprising:

an automatic card reader having a reader that reads data from a customer's card and a writer that writes data to the card;

a storage unit that stores the data read from the card;

an input unit that inputs data concerning an amount of a transaction;

a write controller that directs said automatic card reader to write data onto the card;

multiple setting means for setting a multiple to calculate service points according to the amount of a transaction;

a controller, responsive to the recorded data, that calculates service points in accordance with the amount of the transaction and adds the points to cumulative points in the card, by communicating with said write controller, prior to ejecting the card from the apparatus, said controller issuing increased service points according to the multiple and adding the increased points to the cumulative points.

14. An apparatus as set forth in claim 13, wherein:

said controller sets an optional rate for issuing points.

15. An apparatus as set forth in claim 13, wherein:

the card is a magnetic card.

16. An apparatus as set forth in claim 13, wherein:

the card is an integrated circuit card.

17. An apparatus as set forth in claim 13, wherein:

the card is a magnetooptic card.

18. A method for point-of-sales settlement of customer transactions, comprising the steps of:

reading information encoded on a card presented by a customer for settlement of a purchase, the information including a total amount of service points accumulated from past transactions and an anniversary date;

issuing normal service points corresponding to the purchase by writing a new total amount of service points to the card, the new total amount of service points reflecting the normal service points and the total amount of service points accumulated from past transactions; and issuing additional service points by writing a new total amount of service points to the card when the anniversary date matches a present date, the new total amount of service points reflecting the additional service points and the total amount of service points accumulated from past transactions.

19. A computer-readable medium encoded with a program for point-of-sales settlement of customer transactions, said program comprising the functions of:

reading information encoded on a card presented by a customer for settlement of a purchase, the information including a total amount of service points accumulated from past transactions and an anniversary date;

issuing normal service points corresponding to the purchase by writing a new total amount of service points to the card, the new total amount of service points reflecting the normal service points and the total amount of service points accumulated from past transactions; and issuing additional service points by writing a new total amount of service points to the card when the anniversary date matches a present date, the new total amount of service points reflecting the additional service points and the total amount of service points accumulated from past transactions.

* * * * *